US011556126B2

(12) United States Patent
Hammond et al.

(10) Patent No.: US 11,556,126 B2
(45) Date of Patent: Jan. 17, 2023

(54) ONLINE AGENT PREDICTIONS USING SEMANTIC MAPS

(71) Applicant: TOYOTA RESEARCH INSTITUTE, INC., Los Altos, CA (US)

(72) Inventors: Marcus Hammond, Mountain View, CA (US); Tyler William Packard, Palo Alto, CA (US); Randall St Romain, II, Dexter, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 252 days.

(21) Appl. No.: 16/280,847

(22) Filed: Feb. 20, 2019

(65) Prior Publication Data

US 2020/0264609 A1  Aug. 20, 2020

(51) Int. Cl.
  *G05D 1/00* (2006.01)
  *G05B 13/04* (2006.01)
  *G05D 1/02* (2020.01)
  *G05B 13/02* (2006.01)

(52) U.S. Cl.
  CPC ....... *G05D 1/0088* (2013.01); *G05B 13/0265* (2013.01); *G05B 13/048* (2013.01); *G05D 1/0246* (2013.01); *G05D 1/0257* (2013.01); *G05D 1/0289* (2013.01)

(58) Field of Classification Search
  CPC .. G05D 1/0088; G05D 1/0289; G05D 1/0246; G05D 1/0257; G05B 13/048; G05B 13/0265; B60W 2420/52; B60W 2420/42; B60W 2554/4049; B60W 30/0956; G08G 1/166
  See application file for complete search history.

(56) References Cited

U.S. PATENT DOCUMENTS

| 9,053,433 | B2 | 6/2015 | Will et al. |
| 9,734,455 | B2 | 8/2017 | Levinson et al. |
| 9,946,260 | B2 | 4/2018 | Shashua et al. |
| 2017/0124476 | A1* | 5/2017 | Levinson ............... G06V 20/58 |
| 2019/0072973 | A1* | 3/2019 | Sun ..................... B62D 15/0265 |
| 2020/0117200 | A1* | 4/2020 | Akella ................. G05D 1/0088 |

OTHER PUBLICATIONS

Wang, Peng, et al., "DeLS-3D: Deep Localization and Segmentation with a 3D Semantic Map," openaccess.thecvf.com, May 13, 2018, pp. 5860-5869.
WAYMO, "WAYMO Safety Report on the Road to Fully Self-Driving," storage.googleapis.com, Oct. 2017, pp. 1-43.

\* cited by examiner

*Primary Examiner* — Jess Whittington
*Assistant Examiner* — Brian E Yang
(74) *Attorney, Agent, or Firm* — Seyfarth Shaw LLP (57) ABSTRACT

A method for controlling a vehicle based on a prediction from a semantic map is presented. The method includes receiving a snapshot of an environment from one or more sensors. The method also includes generating the semantic map based on the snapshot and predicting an action of a dynamic object in the snapshot based on one or more surrounding objects. The method still further includes controlling an action of the vehicle based on the predicted action.

18 Claims, 6 Drawing Sheets

ONLINE AGENT PREDICTIONS USING SEMANTIC MAPS

BACKGROUND

Field

Certain aspects of the present disclosure generally relate to predicting an action of an agent and more particularly, to a system and method for predicting the action of the agent based on a semantic map of an environment.

Background

Autonomous agents (e.g., vehicles, robots, drones, etc.) and semi-autonomous agents use machine vision for analyzing a surrounding environment. Machine vision is distinct from the field of digital image processing due to the desire to recover a three-dimensional (3D) structure of the world from images and using the 3D structure for fully understanding a scene. That is, machine vision strives to provide a 3D map of the environment that surrounds an autonomous agent.

In operation, autonomous agents may rely on trained neural networks, such as a convolutional neural network (CNN), to identify objects (e.g., pedestrians, cyclists, other cars, etc.) within areas of interest in an image of a surrounding environment. For example, a CNN may be trained to identify objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as the autonomous agent.

In addition to detecting objects, autonomous agents may predict a path (e.g., trajectory) of one or more detected objects. The predicted trajectory may be used for collision avoidance, route planning, and/or other tasks. Conventional trajectory prediction models predict an object's trajectory based on the 3D map generated by the machine vision system. It is desirable to improve prediction models to predict an object's trajectory without the use of a previously generated 3D map and/or an object's previous trajectory.

SUMMARY

In one aspect of the present disclosure, a method for controlling a vehicle based on a prediction from a semantic map is disclosed. The method includes receiving a snapshot of an environment from one or more sensors. The method also includes generating the semantic map based on the snapshot. The method further includes predicting an action of a dynamic object in the snapshot based one or more surrounding objects. The method still further includes controlling an action of the vehicle based on the predicted action.

In another aspect of the present disclosure, a non-transitory computer-readable medium with non-transitory program code recorded thereon is disclosed. The program code is for controlling a vehicle based on a prediction from a semantic map. The program code is executed by a processor and includes program code to receive a snapshot of an environment from one or more sensors. The program code also includes program code to generate the semantic map based on the snapshot. The program code further includes program code to predict an action of a dynamic object in the snapshot based one or more surrounding objects. The program code still further includes program code to control an action of the vehicle based on the predicted action.

Another aspect of the present disclosure is directed to an apparatus for controlling a vehicle based on a prediction from a semantic map. The apparatus having a memory and one or more processors coupled to the memory. The processor(s) is configured to receive a snapshot of an environment from one or more sensors. The processor(s) is also configured to generate the semantic map based on the snapshot. The processor(s) is further configured to predict an action of a dynamic object in the snapshot based one or more surrounding objects. The processor(s) still further configured to control an action of the vehicle based on the predicted action.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Autonomous agents (e.g., vehicles, robots, drones, etc.) and semi-autonomous agents may use scene understanding models, such as a trained artificial neural network, to identify objects and/or areas of interest in an image. Additionally, autonomous agents may predict a path (e.g., trajectory) of one or more detected objects. The predicted trajectory may be used for collision avoidance, route planning, and/or other tasks.

Conventional trajectory prediction models predict an object's trajectory based on a 3D map. One or more sensors, such as a light detection and ranging (LIDAR) sensor, associated with a machine vision system may generate the 3D map of the environment and localize each object in the 3D map. The machine vision system may also label each object in the 3D map based on semantic segmentation and/or instance segmentation. An object's trajectory in a 3D map may be based on one or more of the object's previously observed trajectory, a type of object (e.g., car, person, bicycle, etc.), surrounding objects, and/or environmental constraints. That is, an object's dynamics may be used to predict the object's trajectory.

Instance segmentation identifies individual instances of the same object and does not identify uncountable objects (e.g., background objects). In contrast, semantic segmentation accounts for semantic information of a scene and ignores the instance relationship between pixels with the same semantic label. For example, two different cars may receive the same label (e.g., car) in a semantic segmentation map.

In semantic segmentation, each pixel of an input, such as a red-green-blue (RGB) image, is associated with a label (e.g., semantic label) to generate a semantic segmentation map. For example, in an image of a road, pixels may be associated with a predetermined number of labels, such as car, road, background, sign, or other objects found in a road image. In this example, the agent may use semantic segmentation to distinguish the road from other objects, such that the agent may safely move within an environment.

It is desirable to improve prediction models to predict an object's trajectory without the use of a previously generated 3D map. Aspects of the present disclosure are directed to using semantic information obtained for various regions in an environment to predict how an object will move through the environment. In one configuration, the object's trajectory is predicted without using a previously generated 3D, or 2D, map.

As discussed, an agent may use semantic segmentation (e.g., semantic labeling) to identify specific areas of an environment (e.g., road, sidewalk, etc.). The semantic labels obtained by the agent for various navigation tasks may be repurposed for trajectory prediction. By repurposing the semantic labels, the agent may predict a trajectory without the need for some information used by conventional trajectory prediction models.

For example, the agent may predict an object's trajectory without information regarding the object's previous trajectory and/or environmental constraints. As such, aspects of the present disclosure reduce the amount of information obtained by a sensor. Therefore, aspects of the present disclosure may reduce processor load and an amount of information stored in memory.

Additionally, by observing different types of terrain (e.g., road, crosswalk, sidewalk, lane lines, etc.) an object's trajectory may be inferred over longer time horizons in comparison to conventional trajectory prediction models, such as conventional trajectory prediction models that only consider an object's dynamics (e.g., kinematic constraints). That is, conventional trajectory prediction models do not take into account context beyond an object's current and past motion. Rather, conventional trajectory prediction models place constraints on the predicted trajectory based on assumed physical limitations of the objects (e.g., pedestrians are not predicted to have velocities above a jogging speed, cars are assumed to travel along arcs, etc.).

As discussed, an agent may detect objects from various sensor outputs. For example, a 2D camera may generate 2D RGB images and a LIDAR sensor may generate a 3D point cloud that provides height and depth information. In one configuration, objects are localized based on features extracted from different sensor outputs.

Figure 1:
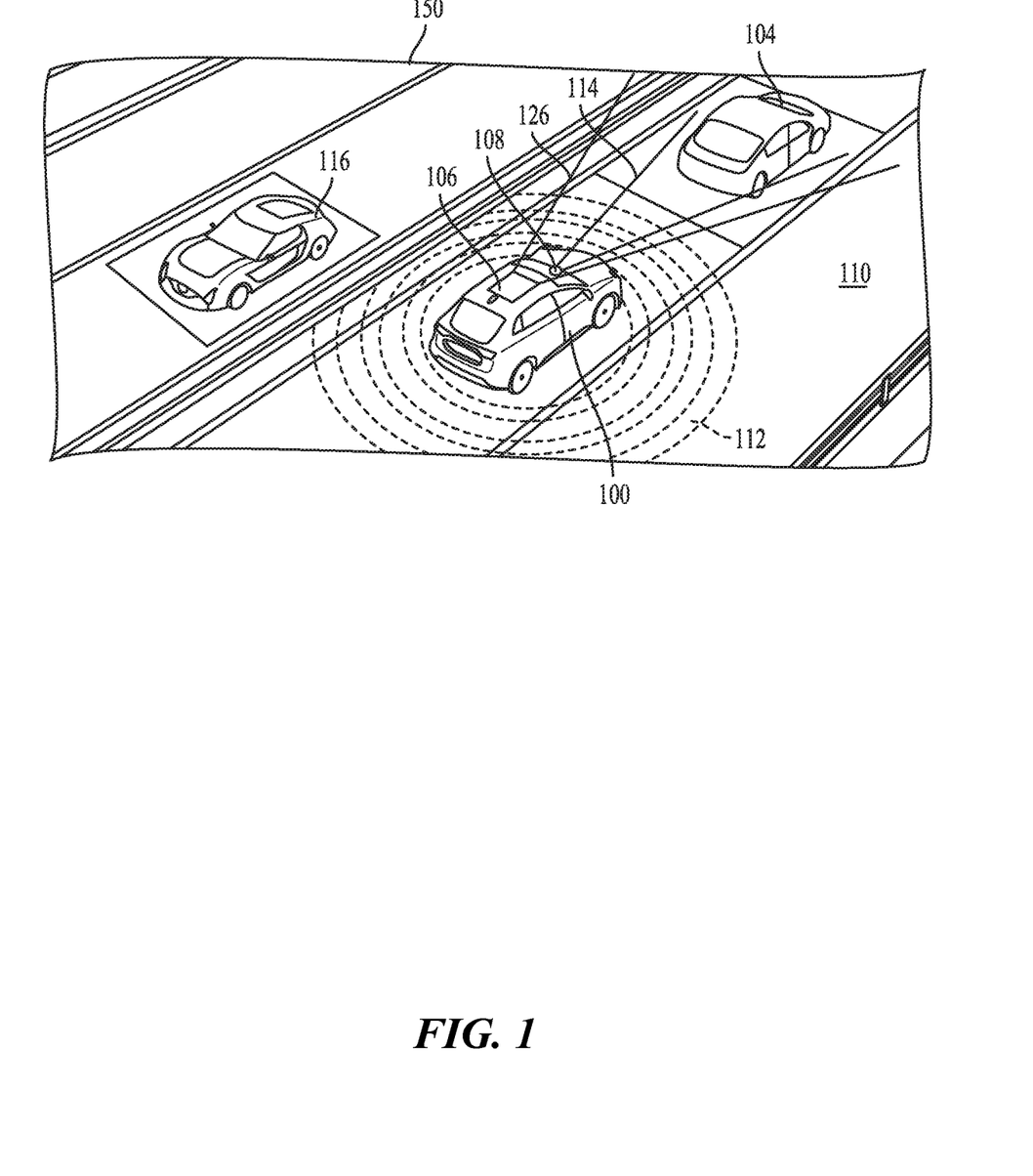
FIG. 1 illustrates an example of an agent in an environment according to aspects of the present disclosure.

FIG. 1 illustrates an example of an agent 100 in an environment 150 according to aspects of the present disclosure. As shown in FIG. 1, the agent 100 may be traveling on a road 110. A first vehicle 104 may be ahead of the agent 100 and a second vehicle 116 may be adjacent to the agent 100. In this example, the agent 100 may include a 2D camera 108, such as a 2D RGB camera, and a LIDAR sensor 106. Other sensors, such as RADAR and/or ultrasound, are also contemplated. Additionally, or alternatively, the agent 100 may include one or more additional 2D cameras and/or LIDAR sensors. For example, the additional sensors may be side facing and/or rear facing sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream may include a 3D cloud point of objects in a second field of view 126, such as a forward facing field of view.

The 2D image captured by the 2D camera includes a 2D image of the first vehicle 104, as the first vehicle 104 is in the 2D camera's 108 field of view 114. A semantic segmentation system of the agent 100 may extract features from objects in the 2D image. For example, an artificial neural network, such as a convolutional neural network, extracts features of the first vehicle 104. The extracted features may be used to generate a semantic label for the first vehicle 104.

As is known to those of skill in the art, a LIDAR sensor uses laser light to sense the shape, size, and position of objects in an environment. The LIDAR sensor may vertically and horizontally scan the environment. In the current example, the artificial neural network of the agent 100 may extract height and/or depth features from the first output stream. The artificial neural network of the agent 100 may also extract height and/or depth features from the second output stream. The extracted features may be used to generate semantic labels.

The environment surrounding an agent may include dynamic objects and static object. A dynamic object refers to an object that may move, such as a pedestrian, bicycle, or car. A static object refers to background objects, such as a road, a sidewalk, or vegetation. In one configuration, semantic segmentation is used for contextual information regarding a dynamic object.

For example, based on the semantic labels, an agent may determine that a pedestrian (e.g., dynamic object) is walking on a sidewalk. The agent may also detect that vegetation (e.g., bushes, grass, trees, etc.) is placed on the sidewalk between the pedestrian and a road. Based on the contextual information, the agent may predict that the pedestrian will continue to walk in a straight line rather than crossing over the vegetation into the road. As another example, the agent may determine that a pedestrian walking along a road is less likely to cross into the road in comparison to a pedestrian walking near a crosswalk.

Figure 2:
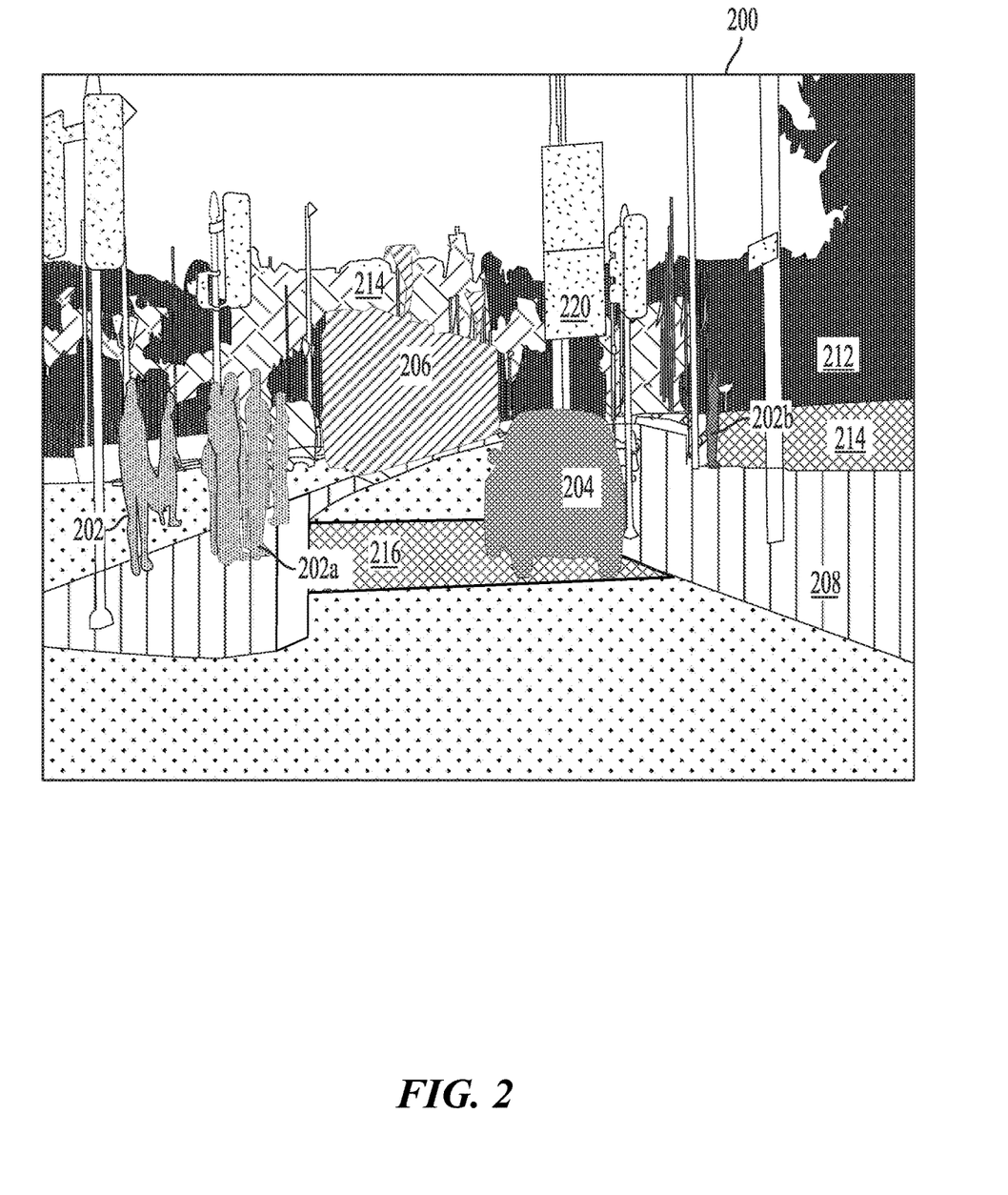
FIGS. 2 and 3 illustrate examples semantic maps according to aspects of the present disclosure.

FIG. 2 illustrates an example of predicting an object's trajectory according to aspects of the present disclosure. As shown in FIG. 2, an agent may obtain an image 200 with semantic labels. That is, each pixel of the image 200 is associated with a semantic label. The semantic labels may be generated via a neural network, such as a convolution neural network, trained for semantic segmentation. In the example of FIG. 2, the neural network labels pedestrians 202, cars 204, a train 206, sidewalks 208, street signs 220, vegetation 212, buildings 214 (e.g., structures), and crosswalks 216. Aspects of the present disclosure are not limited to labeling the discussed elements, other elements, such as poles for holding street signs may be labeled. For simplicity, some labels are omitted.

Based on previous training, the neural network may determine contextual information for one or more dynamic objects in the image 200. The dynamic objects may include the pedestrians 202, cars 204, and trains 206. The contextual information may be based on a dynamic object's 202, 204, 206 relation to other objects (e.g., state of dynamic) in the image 200.

For example, as shown in FIG. 2, based on the semantic labeling, the neural network determines that the first pedestrian 202a is standing on a sidewalk 208 and is adjacent to a crosswalk 216. Based on the contextual information (e.g., standing on a sidewalk 208/adjacent to a crosswalk 216), the neural network may predict that the first pedestrian 202a is likely to cross the crosswalk 216 at a future time step. As another example, based on the semantic labeling, the neural network determines that the second pedestrian 202b is standing on a sidewalk 208 and is adjacent to a wall 214 and vegetation 212. Based on the contextual information (e.g., standing on a sidewalk 208/adjacent to a wall 214 and vegetation 212), the neural network may predict that the second pedestrian 202b is likely to walk near the wall 214 and the vegetation 212. The predictions of the pedestrians 202a, 202b actions may control future actions of an autonomous agent.

Figure 3:
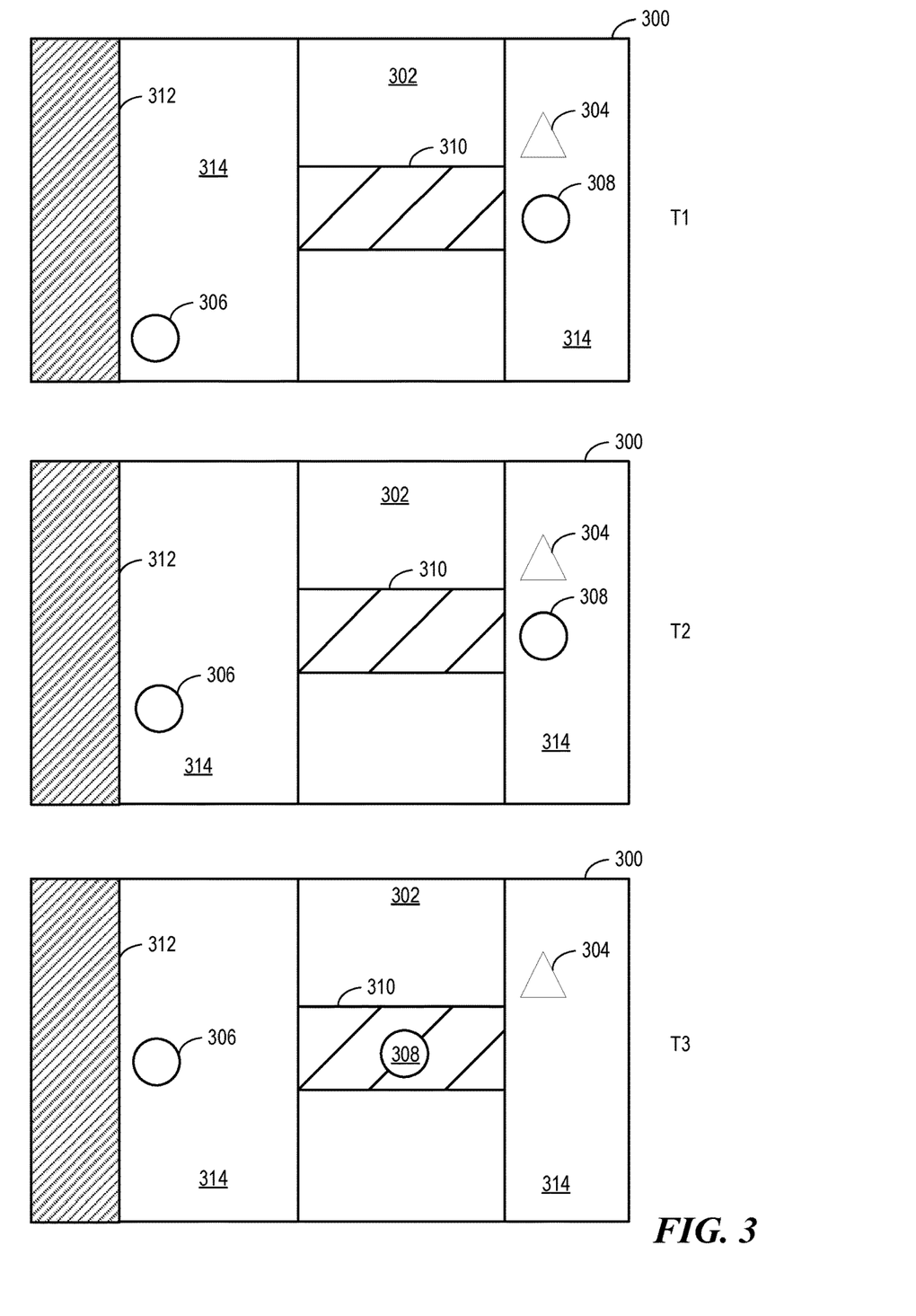

During training, the neural network may receive a series of frames. Each frame may be semantically labeled. From the series of frames, the neural network may learn an object's most likely action based on the object's relationship to other objects in the frame. FIG. 3 illustrates an example of training a neural network to determine an object's action based on semantic labels. Specifically, FIG. 3 illustrates a top-down view of a location 300 at three different time steps (T1, T2, and T3).

As shown in FIG. 3, the location 300 includes a road 302, a traffic light 304, a first pedestrian 306, a second pedestrian 308, a crosswalk 310, a building 312, and sidewalks 314. The data corresponding to a spatial location of each object 302, 304, 306, 308, 310, 312, 314 in the location 300 is input to a learning function. The learning function determines a start location and an end location of each dynamic object in the location 300. In this example, the dynamic objects are the first pedestrian 306 and the second pedestrian 308.

In one configuration, the learning function learns correlations between a dynamic object's path and surrounding objects. For example, as shown in FIG. 3, the first pedestrian 306 followed a path that is substantially parallel to the building 312. Based on the provided data, the learning function learns that a pedestrian is likely to walk parallel to a building when they are near a building at a specific distance from a road.

In another example, as shown in FIG. 3, the second pedestrian 308 entered the crosswalk 310 after standing on the sidewalk 314 near the traffic light 304 and the crosswalk 310. Based on the provided data, the learning function learns that a pedestrian is likely to enter a crosswalk when they are standing adjacent to the crosswalk near a traffic light. That is, the learning function correlates the pedestrian's action to the surrounding objects (e.g., a crosswalk and a traffic light).

After training, an autonomous agent may use a snapshot of an environment to determine the actions of one or more dynamic agents in the environment. The snapshot may be a partial view of the environment. The snapshot may be obtained by one or more sensors, such as LIDAR, RADAR, an RGB camera, or another sensor. The snapshot may be processed by a semantic segmentation model to provide semantic labels to the snapshot.

Figure 4:
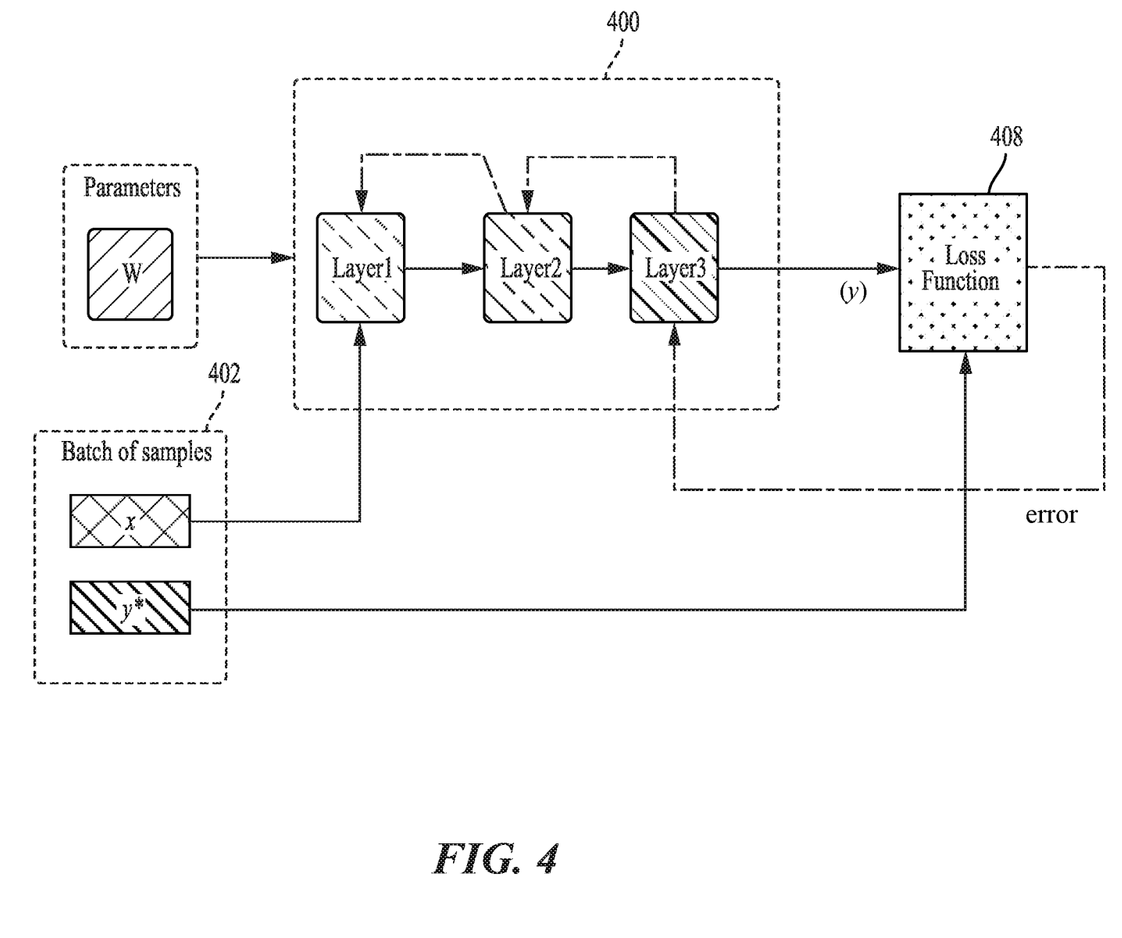
FIG. 4 illustrates a flow diagram for training a prediction model according to an aspect of the present disclosure.

FIG. 4 illustrates a flow diagram for training a prediction model 400 according to an aspect of the present disclosure. In one configuration, semantic labeled frames (x) are stored in a data source 402, such as a training server. The semantic labeled frames (x) refer to frames and corresponding semantic labels. The data source may also store ground truth actions (y*) corresponding to actions of dynamic objects in the semantic labeled frames (x). The ground truth classification actions (y*) represent the true action of one or more dynamic objects in each semantic labeled frame (x).

The prediction model 400 may be initialized with a set of parameters w. The parameters may be used by layers of the prediction model 400, such as layer 1, layer 2, and layer 3, of the prediction model 400 to set weights and biases. Layer 3 may be a fully connected layer. During training, the prediction model 400 receives semantic labeled frames (x) to predict an action of one or more dynamic objects in the semantic labeled frames (x).

The prediction model 400 outputs a predicted action (y) for one or more dynamic objects in each semantic labeled frame (x). The predicted actions (y) are received at a loss function 408. The loss function 408 compares the predicted actions (y) to the ground truth actions (y*). The prediction error is the difference (e.g., loss) between the predicted action (y) and the ground truth action (y*). The prediction error is output from the loss function 408 to the prediction model 400. The error is back-propagated through the prediction model 400 to update the parameters. The training may be performed during an offline phase of the prediction model 400.

Figure 5:
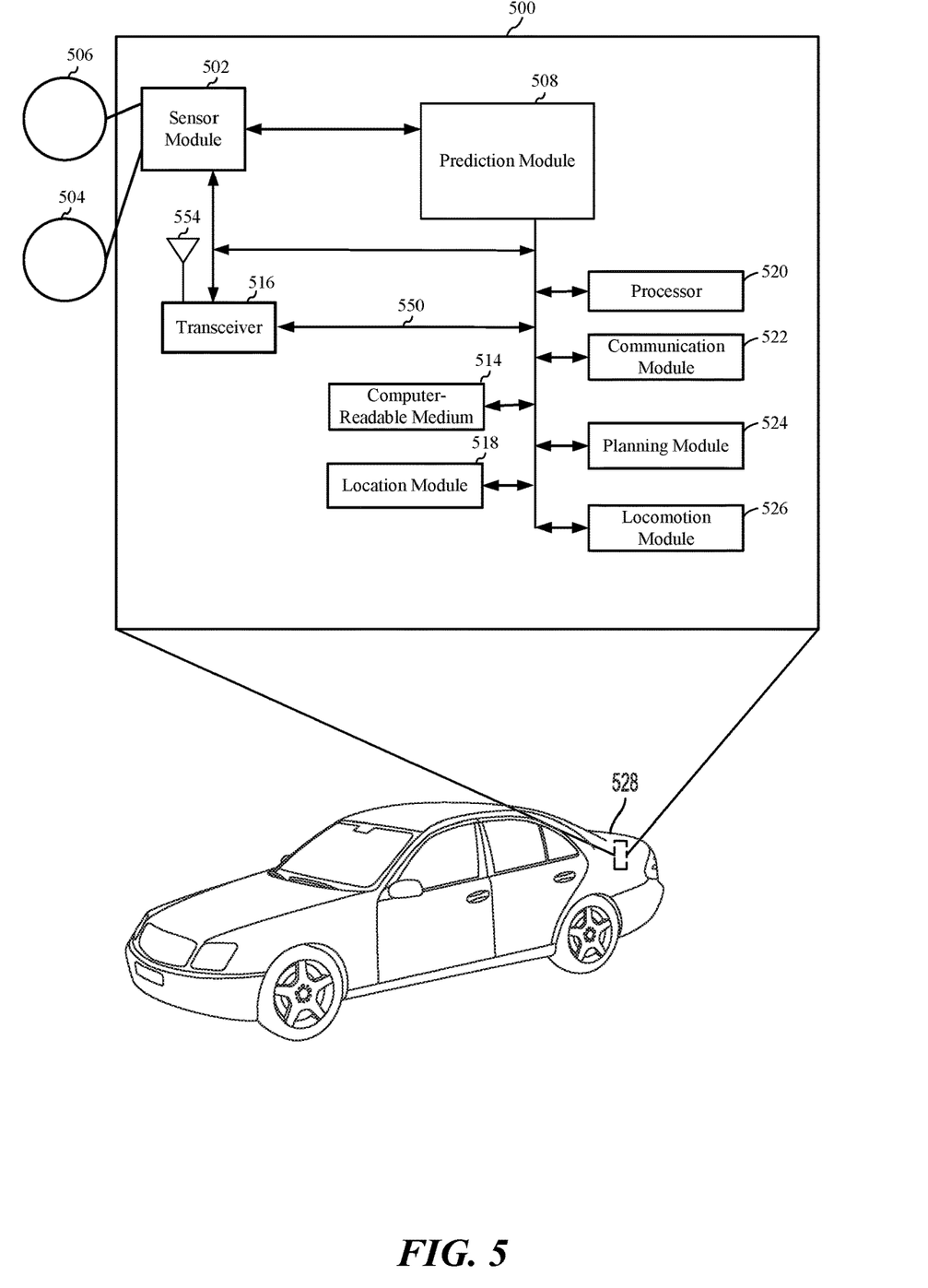
FIG. 5 is a diagram illustrating an example of a hardware implementation for an object action prediction system according to aspects of the present disclosure.

FIG. 5 is a diagram illustrating an example of a hardware implementation for an object action prediction system 500, according to aspects of the present disclosure. The object action prediction system 500 may be a component of a vehicle, a robotic device, or another device. For example, as shown in FIG. 5, the object action prediction system 500 is a component of a vehicle 528. Aspects of the present disclosure are not limited to the vehicle 528, as other devices, such as a bus, boat, drone, or robot, are also contemplated for using the object action prediction system 500. The vehicle 528 may be autonomous or semi-autonomous.

The object action prediction system 500 may be implemented with a bus architecture, represented generally by a bus 550. The bus 550 may include any number of interconnecting buses and bridges depending on the specific application of the object action prediction system 500 and the overall design constraints. The bus 550 links together various circuits including one or more processors and/or hardware modules, represented by a processor 520, a communication module 522, a location module 518, a sensor module 502, a locomotion module 526, a planning module 524, a computer-readable medium 514, and a prediction module 508. The bus 550 may also link various other circuits such as timing sources, peripherals, voltage regulators, and power management circuits, which are well known in the art, and therefore, will not be described any further.

The object action prediction system 500 includes a transceiver 516 coupled to the processor 520, the sensor module 502, the prediction module 508, the communication module 522, the location module 518, the locomotion module 526, the navigation module 524, and the computer-readable medium 514. The transceiver 516 is coupled to an antenna 554. The transceiver 516 communicates with various other devices over a transmission medium. For example, the transceiver 516 may receive commands via transmissions from a user or a remote device. As another example, the transceiver 516 may transmit driving statistics and information from the prediction module 508 to a server (not shown).

The object action prediction system 500 includes the processor 520 coupled to the computer-readable medium 514. The processor 520 performs processing, including the execution of software stored on the computer-readable medium 514 providing functionality according to the disclosure. The software, when executed by the processor 520, causes the object action prediction system 500 to perform the various functions described for a particular device, such as the vehicle 528, or any of the modules 502, 514, 516, 518, 520, 522, 524, 526. The computer-readable medium 514 may also be used for storing data that is manipulated by the processor 520 when executing the software.

The sensor module 502 may be used to obtain measurements via different sensors, such as a first sensor 506 and a second sensor 504. The first sensor 506 may be a vision sensor, such as a stereoscopic camera or a red-green-blue (RGB) camera, for capturing 2D images. The second sensor 504 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 504, 506. The measurements of the first sensor 506 and the second sensor 504 may be processed by one or more of the processor 520, the sensor module 502, the communication module 522, the location module 518, the locomotion module 526, and the planning module 524, in conjunction with the computer-readable medium 514, to implement the functionality described herein. In one configuration, the data captured by the first sensor 506 and the second sensor 504 may be transmitted to an external device via the transceiver 516. The first sensor 506 and the second sensor 504 may be coupled to the vehicle 528 or may be in communication with the vehicle 528.

The location module 518 may be used to determine a location of the vehicle 528. For example, the location module 518 may use a global positioning system (GPS) to determine the location of the vehicle 528. The communication module 522 may be used to facilitate communications via the transceiver 516. For example, the communication module 522 may be configured to provide communication capabilities via different wireless protocols, such as WiFi, long term evolution (LTE), 4G, etc. The communication module 522 may also be used to communicate with other components of the vehicle 528 that are not modules of the object action prediction system 500.

The locomotion module 526 may be used to facilitate locomotion of the vehicle 528. As an example, the locomotion module 526 may control the movement of the wheels. As another example, the locomotion module 526 may be in communication with a power source of the vehicle 528, such as an engine or batteries. Of course, aspects of the present disclosure are not limited to providing locomotion via wheels and are contemplated for other types of components for providing locomotion, such as propellers, treads, fins, and/or jet engines.

The object action prediction system 500 also includes the planning module 524 for planning a route or controlling the locomotion of the vehicle 528, via the locomotion module 526. The planning module 524 may be in communication with the prediction module 508, the sensor module 502, the transceiver 516, the processor 520, the communication module 522, the location module 518, the locomotion module 526, the planning module 524, and the computer-readable medium 514. In one configuration, the planning module 524 overrides the user input. The modules may be software modules running in the processor 520, resident/stored in the computer-readable medium 514, one or more hardware modules coupled to the processor 520, or some combination thereof.

According to aspects of the present disclosure, the object action prediction system 500 includes a prediction module 508 in communication with the planning module 524, the sensor module 502, the transceiver 516, the processor 520, the communication module 522, the location module 518, the locomotion module 526, the planning module 524, and the computer-readable medium 514.

In one configuration, the prediction module 508 receives a snapshot of an environment via data captured from one or more sensors 504, 506. The prediction module 508 may generate a semantic map of the snapshot based on the received data. In another configuration, the prediction module 508 receives a semantic map of an environment from a sensor module 504, transceiver 516, and/or processor 520. Based on the semantic map, the prediction module 508 predicts a subsequent action for one or more dynamic objects in the semantic map. The prediction module 508 may continuously generate predictions based on semantic maps. Alternatively, the prediction module 508 may generate predictions at specific intervals or in response to an event, such as detecting a new object in an environment.

In response to the prediction, the prediction module 508 may communicate with one or more of the transceiver 516, the processor 520, the communication module 522, the location module 518, the locomotion module 526, the planning module 524, and/or the computer-readable medium 514 to control a subsequent action of the vehicle 528. For example, if the prediction module 508 predicts that a pedestrian is likely to enter a crosswalk ahead of the vehicle 528, the prediction module 508 may signal the locomotion module 518 to reduce the vehicle's 528 speed or stop. As another example, if the prediction module 508 predicts that a pedestrian is likely to enter a crosswalk ahead of the vehicle 528, the prediction module 508 may signal the planning module 524 to use an alternate route.

Figure 6:
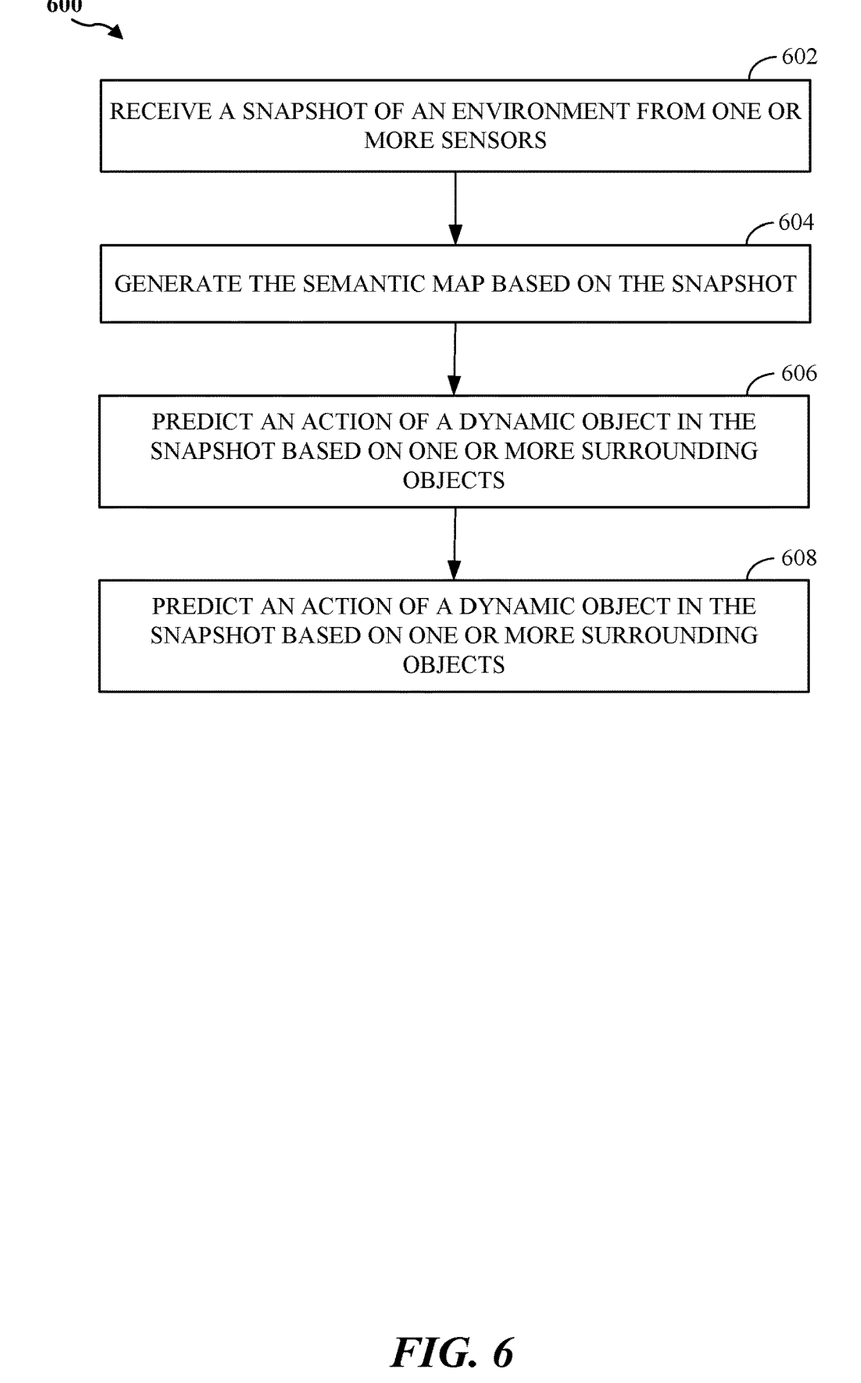
FIG. 6 illustrates a flow diagram for controlling a vehicle based on a prediction from a semantic map according to aspects of the present disclosure.

FIG. 6 illustrates a method 600 for controlling a vehicle based on a prediction from a semantic map according to an aspect of the present disclosure. As shown in FIG. 6, at block 602 a prediction system receives a snapshot of an environment from one or more sensors. The sensors may include a red-green-blue camera, a LIDAR sensor, or a RADAR sensor. The environment refers to a spatial environment of the vehicle. The snapshot may be a 360° view of the spatial environment or a snapshot of a portion of the spatial environment.

At block 604, the prediction system generates the semantic map based on the snapshot. The semantic map provides pixel-wise or point-wise annotations of object classes. The semantic map may be generated via a trained artificial neural network (e.g., deep-convolutional neural network). At block 606, the prediction system predicts an action of a dynamic object in the snapshot based one or more surrounding objects. The prediction may be independent of a previous action of the dynamic object. Additionally, surrounding objects include dynamic object a static object, or a combination thereof At block 608, the prediction system controls an action of the vehicle based on the predicted action. For example, the prediction system may cause a vehicle to stop or slow down if a pedestrian is predicted to enter an intersection. As another example, the prediction system may cause a vehicle to accelerate or change lanes if an adjacent vehicle is predicted to swerve into a current space occupied by the vehicle. In an optional configuration, the prediction system is trained to predict the action by correlating actions of dynamic objects to surrounding objects.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling a vehicle based on a prediction from a semantic map, comprising:
   receiving, at a first time period, a snapshot of a current environment of the vehicle from at least one sensor of the vehicle;
   generating the semantic map based on a label assigned to each object of a set of objects identified in the snapshot, each object of the set of objects being external to the vehicle;
   identifying a dynamic object from the set of objects based on the label assigned to the dynamic object;
   predicting a future trajectory of the dynamic object at a second time period after the first time period based on a correlation between the dynamic object and at least one other object of the set of objects identified in the snapshot, the future trajectory being predicted independent of:
a previous trajectory of the dynamic object prior to the first time period; and
map information from one or more maps obtained prior to the first time period; and
controlling an action of the vehicle based on the predicted trajectory.

2. The method of claim 1, further comprising predicting the future trajectory at a prediction model of the vehicle, the prediction model trained to correlate actions of dynamic training objects in a training environment to surrounding training objects in the training environment, and the prediction model trained at a third time period prior to the first time period.

3. The method of claim 1, in which the at least one sensor comprises a red-green-blue camera, a LIDAR sensor, or a RADAR sensor.

4. The method of claim 1, in which the semantic map provides pixel-wise or point-wise annotations of object classes.

5. The method of claim 1, in which the predicted future trajectory is independent of a previous action of the dynamic object.

6. The method of claim 1, in which the set of objects comprises at least one of another dynamic object, a static object, or a combination thereof.

7. An apparatus for controlling a vehicle based on a prediction from a semantic map, the apparatus comprising:
a memory;
at least one processor coupled to the memory; and
instructions stored in the memory and operable, when executed by the processor, to cause the apparatus:
to receive, at a first time period, a snapshot of a current environment of the vehicle from at least one sensor of the vehicle;
to generate the semantic map based on a label assigned to each object of a set of objects identified in the snapshot, each object of the set of objects being external to the vehicle;
to identify a dynamic object from the set of objects based on the label assigned to the dynamic object;
to predict a future trajectory of the dynamic object at a second time period after the first time period based on a correlation between the dynamic object and at least one other object of the set of objects identified in the snapshot, the future trajectory being predicted independent of:
a previous trajectory of the dynamic object prior to the first time period; and
map information from one or more maps obtained prior to the first time period; and
to control an action of the vehicle based on the predicted future trajectory.

8. The apparatus of claim 7, in which execution of the instructions further causes the apparatus to predict the future trajectory at a prediction model of the vehicle, the prediction model trained to correlate actions of dynamic training objects in a training environment to surrounding training objects in the training environment, and the prediction model trained at a third time period prior to the first time period.

9. The apparatus of claim 7, in which the at least one sensor comprises a red-green-blue camera, a LIDAR sensor, or a RADAR sensor.

10. The apparatus of claim 7, in which the semantic map provides pixel-wise or point-wise annotations of object classes.

11. The apparatus of claim 7, in which the predicted future trajectory is independent of a previous action of the dynamic object.

12. The apparatus of claim 7, in which the set of objects comprises at least one of another dynamic object, a static object, or a combination thereof.

13. A non-transitory computer-readable medium having program code recorded thereon for controlling a vehicle based on a prediction from a semantic map, the program code executed by a processor and comprising:
program code to receive, at a first time period, a snapshot of a current environment of the vehicle from at least one sensor of the vehicle;
program code to generate the semantic map based on a label assigned to each object of a set of objects identified in the snapshot, each object of the set of objects being external to the vehicle;
program code to identify a dynamic object from the set of objects based on the label assigned to the dynamic object;
program code to predict, at a prediction model integrated with the vehicle, a future trajectory of the dynamic object at a second time period after the first time period based on a correlation between the dynamic object and at least one other object of the set of objects identified in the snapshot, the future trajectory being predicted independent of:
a previous trajectory of the dynamic object prior to the first time period; and
map information from one or more maps obtained prior to the first time period; and
program code to control an action of the vehicle based on the predicted future trajectory.

14. The non-transitory computer-readable medium of claim 13, in which the program code further comprises program code to predict the future trajectory at a prediction model of the vehicle, the prediction model trained to correlate actions of dynamic training objects in a training environment to surrounding training objects in the training environment, and the prediction model trained at a third time period prior to the first time period.

15. The non-transitory computer-readable medium of claim 13, in which the at least one sensor comprises a red-green-blue camera, a LIDAR sensor, or a RADAR sensor.

16. The non-transitory computer-readable medium of claim 13, in which the semantic map provides pixel-wise or point-wise annotations of object classes.

17. The non-transitory computer-readable medium of claim 13, in which the predicted future trajectory is independent of a previous action of the dynamic object.

18. The non-transitory computer-readable medium of claim 13, in which the set of objects comprises at least one of another dynamic object, a static object, or a combination thereof.

* * * * *